United States Patent
Kamoshida

(10) Patent No.: US 8,166,092 B2
(45) Date of Patent: Apr. 24, 2012

(54) ARITHMETIC DEVICE FOR PERFORMING DIVISION OR SQUARE ROOT OPERATION OF FLOATING POINT NUMBER AND ARITHMETIC METHOD THEREFOR

(75) Inventor: Shiro Kamoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1008 days.

(21) Appl. No.: 12/124,696

(22) Filed: May 21, 2008

(65) Prior Publication Data
US 2008/0288571 A1 Nov. 20, 2008

(51) Int. Cl.
*G06F 7/487* (2006.01)
(52) U.S. Cl. .................................. 708/504; 708/500
(58) Field of Classification Search .................. None
See application file for complete search history.

(56) References Cited

U.S. PATENT DOCUMENTS

| | | | |
|---|---|---|---|
| 4,760,550 A | 7/1988 | Katzman et al. | |
| 5,404,324 A | 4/1995 | Colon-Bonet | |
| 5,481,745 A * | 1/1996 | Tatsumi | 708/504 |
| 5,623,435 A | 4/1997 | Takewa et al. | |
| 5,677,861 A | 10/1997 | Inoue et al. | |
| 5,931,895 A * | 8/1999 | Yamada et al. | 708/500 |
| 6,360,241 B1 | 3/2002 | Matson et al. | |
| 7,039,666 B2 * | 5/2006 | Kurd | 708/500 |
| 7,167,887 B2 * | 1/2007 | Kurd | 708/500 |

FOREIGN PATENT DOCUMENTS

| | | |
|---|---|---|
| JP | 6-35676 | 2/1994 |
| JP | 7-182143 | 7/1995 |
| KR | 10-0203468 | 3/1999 |
| KR | 10-0203468 | 6/1999 |
| WO | 91/10189 | 7/1991 |

OTHER PUBLICATIONS

Korean Office Action mailed Aug. 27, 2009 and issued in corresponding Korean Patent Application 10-2008-7010659.
Extended European Search Report dated Feb. 15, 2010 and issued in corresponding European Patent Application 05811612.0.
Chinese Office Action issued Mar. 14, 2011 in corresponding Chinese Patent Application 200580052207.2.

* cited by examiner

*Primary Examiner* — David H Malzahn
(74) *Attorney, Agent, or Firm* — Fujitsu Patent Center

(57) ABSTRACT

When division X/Y of floating point numbers is performed, bit string data of a mantissa x including a fraction xf of X or a mantissa y including a fraction yf of Y is shifted in accordance with magnitude relation between them to perform a fraction computation. Thereby, a fraction division result in which the position of the most significant bit is fixed at a prescribed digit is generated. When a square root operation $\sqrt{Y}$ is performed, a fraction square root operation result in which the position of the most significant bit is fixed at a prescribed digit is generated by an exception handling if all of the three conditions that all the bits in the fraction of Y are one, a difference between the exponent ye of Y and a bias value b is an odd number, and a rounding mode is a positive infinity direction are satisfied.

12 Claims, 10 Drawing Sheets

| s | e | f |

F I G. 4

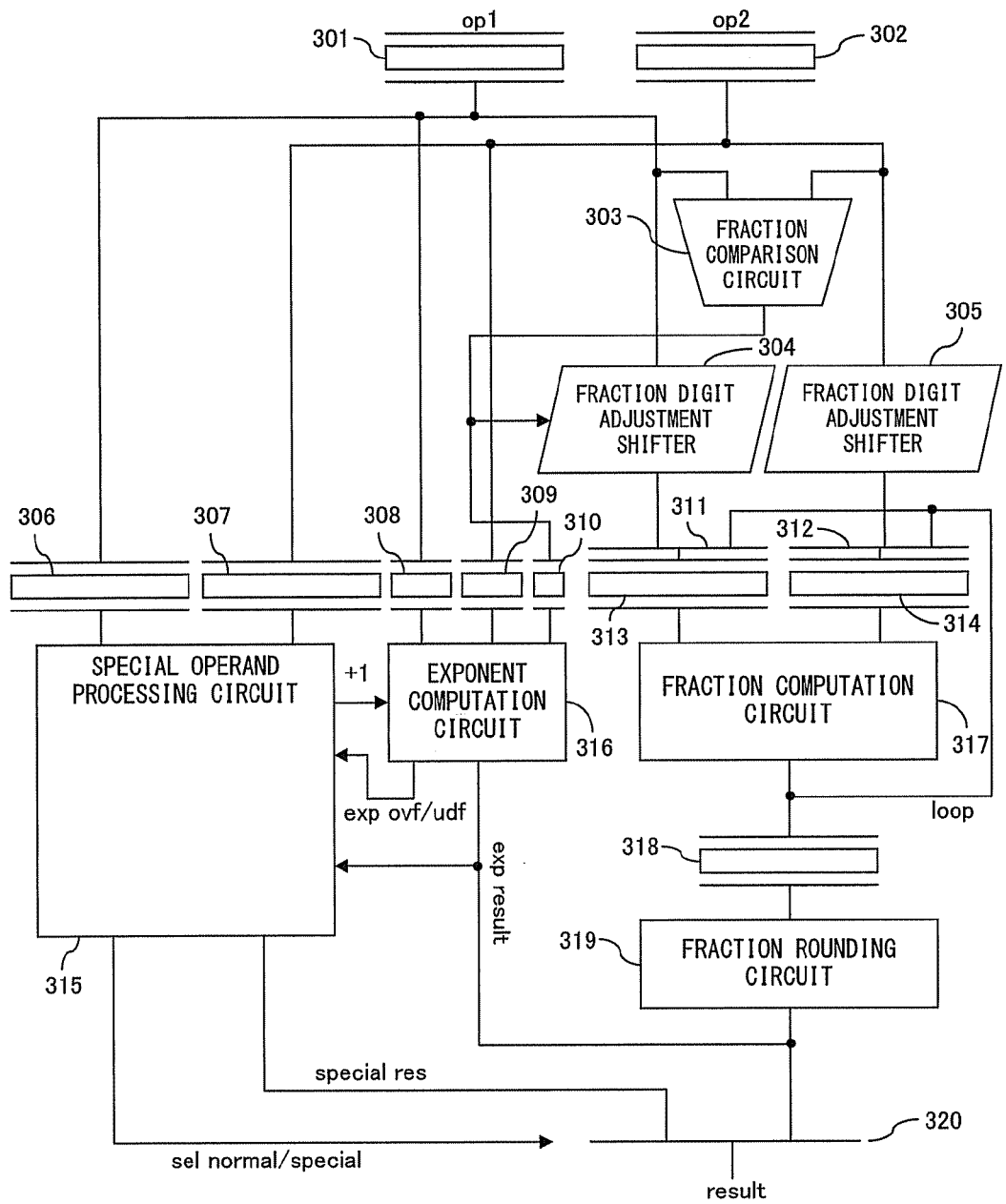
F I G. 5

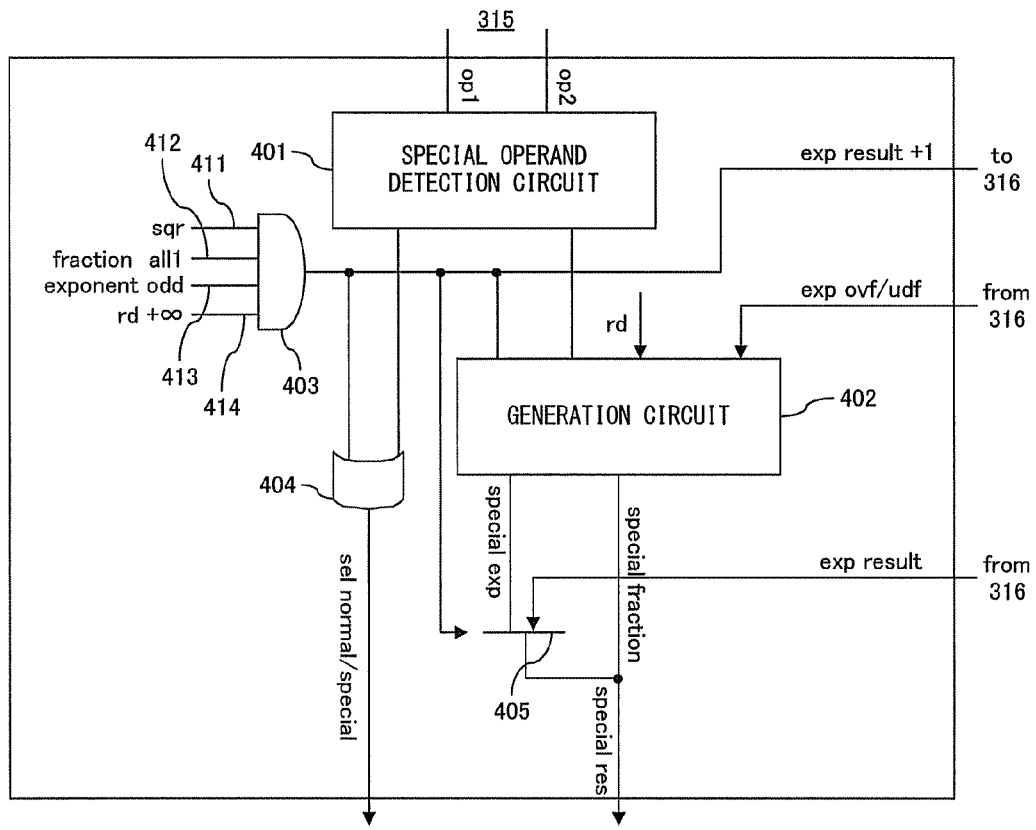
F I G. 6

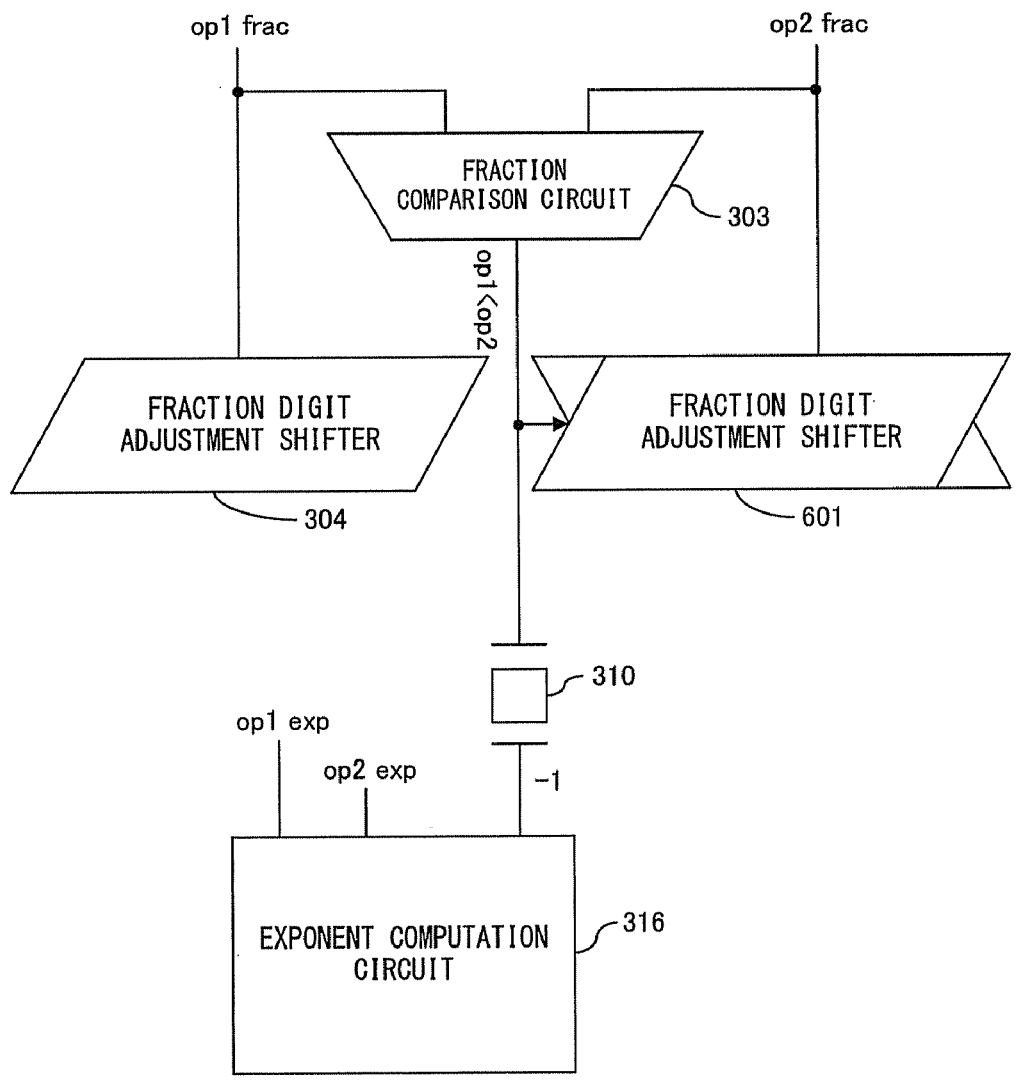
F I G. 8

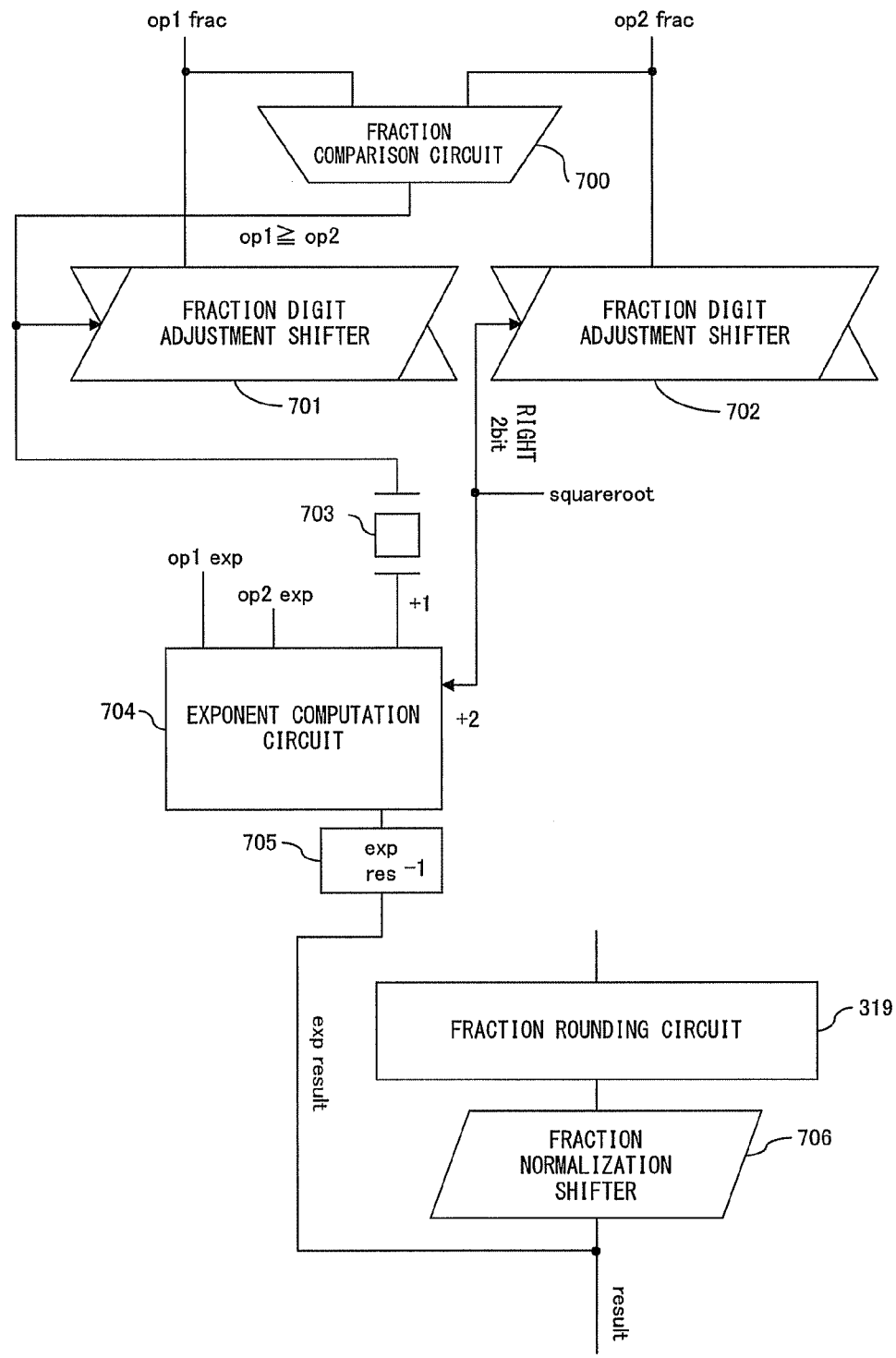
F I G. 9

ARITHMETIC DEVICE FOR PERFORMING DIVISION OR SQUARE ROOT OPERATION OF FLOATING POINT NUMBER AND ARITHMETIC METHOD THEREFOR

BACKGROUND OF THE INVENTION

1. Field of the Invention

The present invention relates to an arithmetic device for performing division of floating point numbers or for performing square root operations, and also relates to an arithmetic method therefor.

2. Description of the Related Art

In recent years, various floating point arithmetic instructions are prepared as the instruction set architectures and arithmetic devices used for executing such floating point arithmetic instructions are provided in CPUs (Central Processing Units) in information processing devices such as server computers, personal computers, and the like (see Patent Documents 1 and 2 listed below).

The SRT (Sweeney-Robertson-Tocher) method, the Newton-Raphson method, the Goldschmidt method, etc. are employed as arithmetic algorithms for division and square root operations of floating point numbers. In these arithmetic methods, loop handling such as described below is performed.

1. SRT Method (1) Division $r(0) = op1\_frac$
for $n = 0$ to $n = k$
$r(n+1) = 2\{r(n) - q(n+1) * op2\}$
if $r(n) \approx 0$, $q(n+1) = 0$
else if $r(n) > 0$, $q(n+1) = 1$
else if $r(n) < 0$, $q(n+1) = -1$
$n = n + 1$
end (2) Square root operation $r(0) = op2\_frac$
for $n = 0$ to $n = k$
$r(n+1) = 2\{r(n) - 2q(n+1) * Q(n) - 2(k-n-1)\}$
$Q(n) = \Sigma(m = 1 \to n) 2(k-m) * q(m)$
    = parital quotient
if $r(n) \approx 0$, $q(n+1) = 0$
else if $r(n) > 0$, $q(n+1) = 1$
else if $r(n) < 0$, $q(n+1) = -1$
$n = n + 1$
end

2. Multiplying Arithmetic Method (Goldschmidt Method)

(1) Division for $n = 0$ to $n = k$
$Gn = Gn - 1 * Fn - 1$    $G0 = OP2$
$Qn = Qn - 1 * Fn - 1$    $Q0 = OP1$
$Fn = 2 - Gn$             $F0 \sim 1/OP2$ (table)
end (2) Square root operation for $n = 0$ to $n = k$
$Xn = (Xn - 1) \wedge 2 * rn - 1$    $X0 = OP2$
$Bn = Bn - 1 * rn - 1$              $B0 = OP2$
$rn = 1 + 1/2(1 - Xn)$              $r0 \sim 1/\sqrt{OP2}$ (table)
end FIG. 1 shows a configuration of the above described conventional arithmetic device for performing division and square root operations of floating point numbers. The arithmetic device shown in FIG. 1 includes registers 11, 12, 15 through 18, 21, 22, 26, 29, and 30, a fraction digit adjustment shifters 13 and 14, selectors 19, 20, and 31, a special operand processing circuit 23, an exponent computation circuit 24, a fraction computation circuit 25, a fraction rounding circuit 27, and a fraction normalization shifter 28.

The special operand processing circuit 23 does not cause the computation unit to perform a usual computation process when two operands op1 and op2 are prescribed data, but causes the computation unit to perform exception handling such as a special operand process that outputs computation results of a fixed value data for the prescribed operand or error handling, or the like. The exponent computation circuit 24 performs the computation of the exponents of op1 and op2. Also, the fraction computation circuit 25 performs division and square root operation of the fractions of op1 and op2.

In the above floating point arithmetics, the computation results output from the fraction computation circuit 25 are not always the normalized numbers (this will be explained later). Further, the rounding process by using the fraction rounding circuit 27 is performed on the computation results, however, there is a probability that the most significant bit is carried over after the rounding process. Thus, usually, after the rounding process, the normalization shifting is performed on the fraction by using the fraction normalization shifter 28, and the value in accordance with the shifted amount is added to the exponent by using the register 29.

FIG. 2 shows a configuration of the special operand processing circuit 23 shown in FIG. 1. The special operand processing circuit 23 includes a special operand detection circuit 41 and a generation circuit 42. The special operand detection circuit 41 detects, on the basis of the values of op1 and op2 that are the computation target operands, the operands that have to undergo the special operand process or the exception handling, outputs the detection signals to the generation circuit 42, and outputs a selection signal denoted by "sel normal/special".

The generation circuit 42 generates a special computation result or an exception flag on the basis of the detection signal from the special operand detection circuit 41, a rounding mode designation signal rd defined in a specification for floating point number arithmetics whose representative example is the IEEE (Institute of Electrical and Electronic Engineers) 754, and the overflow/underflow detection signal "exp ovf/udf" from the exponent computation circuit 24, and outputs it as the signal denoted by "special res".

The selector 31 shown in FIG. 1 operates in accordance with the selection signal "sel normal/special", selects the signal "special res" output from the generation circuit 42 or a normal computation result that is generated by the exponent computation circuit 24 and the fraction computation circuit 25 in order to output the selected signal/result.

However, the above conventional arithmetic device has the problems as described below.

In division and square root operations of floating point numbers, results of the fraction computation circuit 25 are not always the normalized numbers, accordingly the results of the rounding process influences the computation results of the exponent.

Then, the selection signal for the fraction normalization shifter 28 and the input signal for the register 29 used for the addition of exponent are generated from a carry out signal of the incrementer in the fraction rounding circuit 27 or the significant bit signal that corresponds to the carry out signal. Accordingly, because it takes substantial time for the carry of the incrementer to arrive at the carry out signal or the significant bit signal, these signals can often serve as a bottle neck in view of the delay. Also, there is a probability that the overflow or underflow can be caused in the exponent computation circuit 24 depending on the results of the exponent addition. Thus, exception handling for the addition results has to be prepared to be performed after the addition.

As described above, the flow of data starting from the computation results in the fraction computation circuit 25 has been a factor that prevents the arithmetic devices from increasing the computation speed, and also has been a factor that complicates the circuit configurations.

Patent Document 1:
Japanese Patent Application Publication No. 07-182143
Patent Document 2:
Publication of Japanese Translation of PCT application No. 04-507023

SUMMARY OF THE INVENTION

It is an object of the present invention to standardize, into a uniform format, results of a fraction computation in division and square root operations of floating point numbers, and thereby to increase the computation speed and simplify the circuit configurations.

The first arithmetic device comprises a comparison unit, a shifting unit, a fraction computation unit and an exponent computation unit, and performs a computation on floating point operands X and Y having a fraction and an exponent.

The comparison unit compares magnitude of a fraction xf of the X and a fraction yf of the Y. The shifting unit shifts a mantissa x including the xf or a mantissa y including the yf in accordance with a comparison result between the xf and the yf. The fraction computation unit performs a fraction computation by using the mantissa that was shifted by the shifting unit and another mantissa, and outputs a computation result of a fraction in which a position of a most significant bit is fixed to be in a prescribed digit. The exponent computation unit performs an exponent computation by using an exponent xe of the X and an exponent ye of the Y, modifies a result of the exponent computation in accordance with the comparison result, and outputs a computation result of an exponent.

The second arithmetic device comprises a fraction computation unit, an exponent computation unit and an exception handling unit, and performs a square root operation of $\sqrt{Y}$ on a floating point operand Y having a fraction and an exponent.

The fraction computation unit performs a fraction computation by using a fraction of the Y and outputs a fraction square root operation result in which a position of a most significant bit is fixed to be in a prescribed digit when any of three conditions that all the information of a fraction of the Y is one, ye−b that is a difference between an exponent ye of the Y and a bias value b in accordance with a computation precision is an odd number, and a rounding mode is a positive infinity direction is not satisfied. The exponent computation unit performs an exponent computation by using an exponent of the Y and outputs a square root computation result of the exponent of the Y. The exception handling unit outputs a computation result of $\sqrt{Y}$ including a fraction square root operation result in which a position of a most significant bit is fixed to be in a prescribed digit when the three conditions are satisfied.

BRIEF DESCRIPTION OF THE DRAWINGS

FIG. 4 shows a protocol for floating point numbers;
FIG. 5 shows a configuration of an arithmetic device according to the present invention;
FIG. 6 shows a configuration of a special operand processing circuit according to the present invention;
FIG. 8 shows a configuration of addition to an exponent of Y;
FIG. 9 shows a configuration in which the most significant bit is fixed to be in the first decimal place.

DESCRIPTION OF THE PREFERRED EMBODIMENTS

Figure 1:
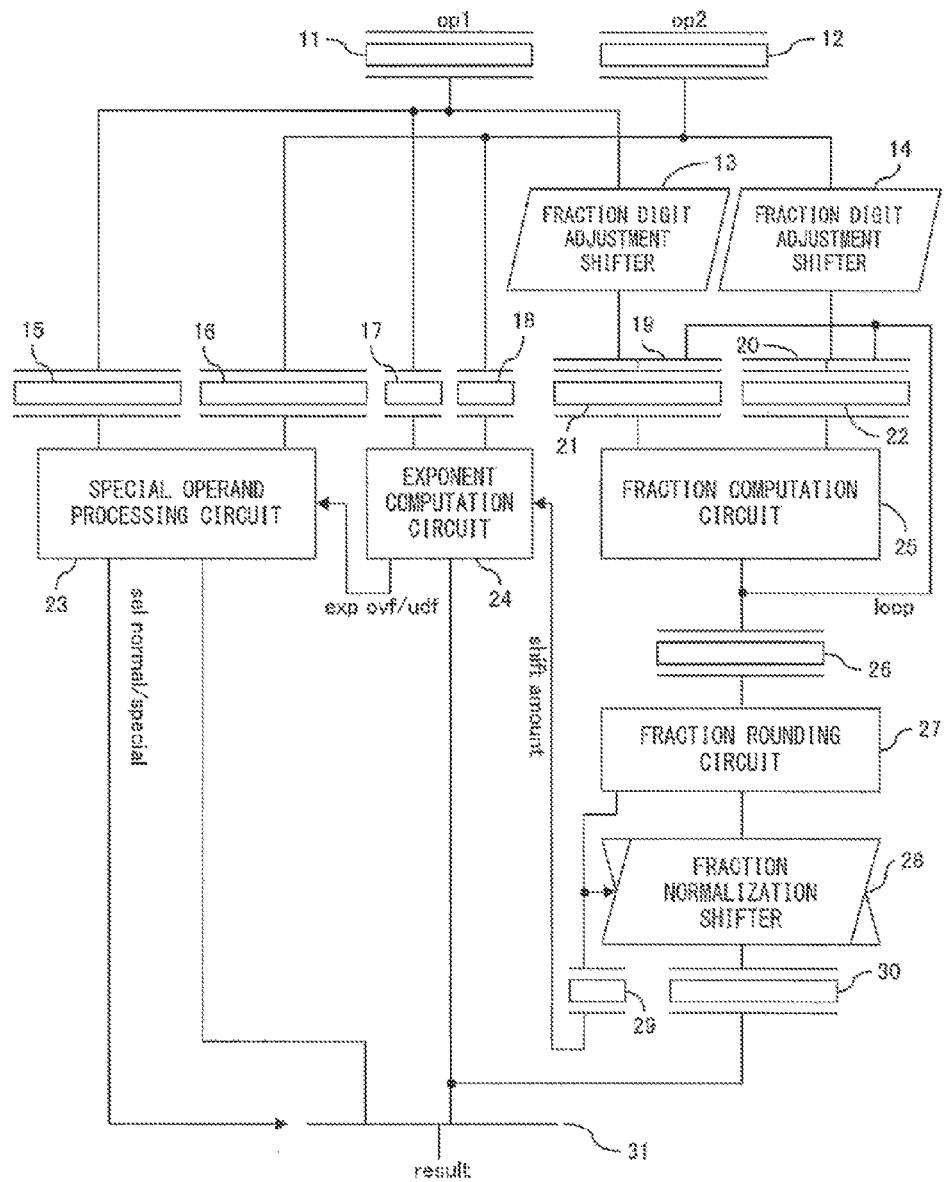
FIG. 1 shows a configuration of a conventional arithmetic device.
Figure 2:
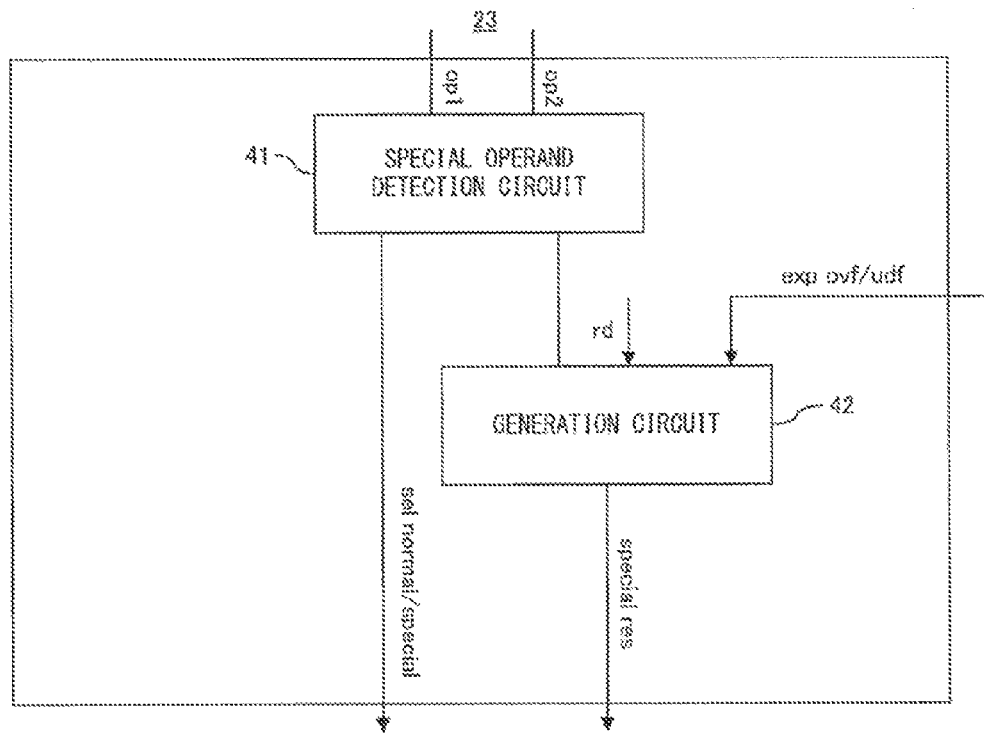
FIG. 2 shows a configuration of a conventional special operand processing circuit.

Hereinafter, embodiments for carrying out the present invention will be explained in detail, by referring to the drawings.

Figure 3:
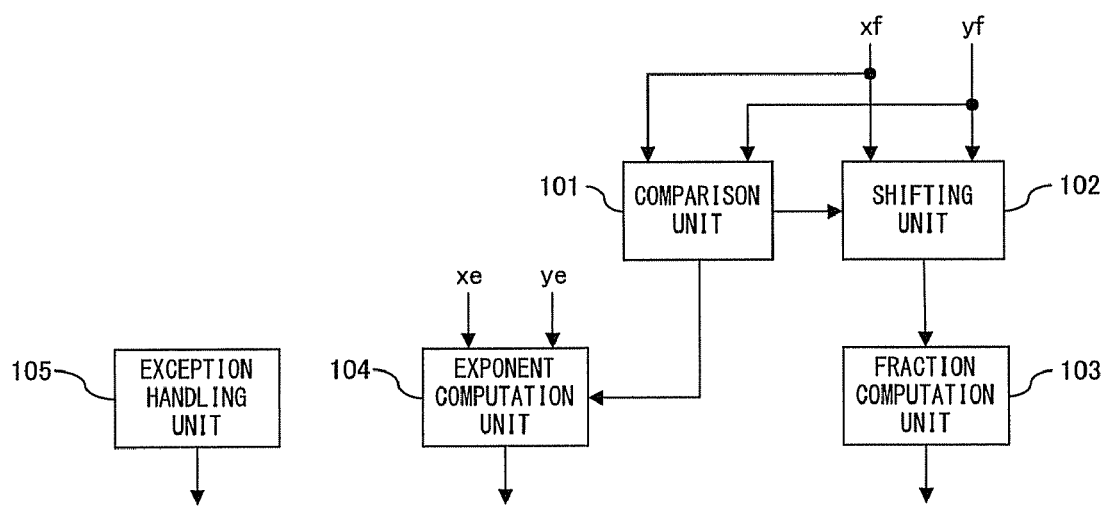
FIG. 3 shows a principle of arithmetic devices according to the present invention.

FIG. 3 shows a principle of first and second arithmetic devices according to the present invention.

The first arithmetic device according to the present invention includes a comparison unit 101, a shifting unit 102, a fraction computation unit 103, and an exponent computation unit 104, and executes a division instruction of X/Y when the floating point numbers X and Y are input as operands.

The comparison unit 101 compares the fraction xf of X and the fraction yf of Y, and the shifting unit 102 shifts the bit string data of the mantissa x including xf or the mantissa y including yf in accordance with the comparison result between xf and yf. The fraction computation unit 103 performs the fraction computation by using the shifted x and y, and outputs the fraction division result whose most significant bit is fixed to be in a prescribed digit regardless of the comparison result. The exponent computation unit 104 performs the exponent computation by using the exponent xe of X and the exponent ye of Y, modifies the result of the exponent computation in accordance with the above comparison result, and outputs the exponent division result.

When a bit string data corresponding to xf and yf in the input operands are input to the comparison unit 101, a signal that represents the magnitude relation between xf and yf is output to the shifting unit 102 and the exponent computation unit 104. In accordance with the signal, the shifting unit 102 shifts the bit string data of x or y to the prescribed direction. The exponent computation unit 104 modifies the computation result of xe and ye on the basis of the prescribed computation. The fraction computation unit 103 uses the shifted bit string data, and thereby generates a bit string data of the fraction division result, the bit string data having its most significant bit fixed to be in the prescribed digit regardless of the magnitude relation between xf and yf.

In division of floating point numbers, as will be described later, the position of the most significant bit in the bit string data of the result of the x/y computation changes in accordance with the magnitude relation between xf and yf. Thus, another method is used as an arithmetic method for fractions only when a particular magnitude relation such as x<y is satisfied, thereby the most significant bit can be fixed to be in a prescribed position.

The second arithmetic device according to the present invention includes the fraction computation unit 103, the exponent computation unit 104, and an exception handling unit 105, and performs a square root operation of √Y when the floating point number Y is input as an operand.

The fraction computation unit 103 performs the fraction computation by using the fraction of Y, and outputs the normalized fraction square root computation result whose most significant bit is fixed to be in a prescribed digit when one of the three conditions (specifically, (1) all bits of the fraction of Y have the values of 1, (2) the difference between the exponent ye of Y and the bias value b i.e., ye−b is an odd number, and (3) the rounding mode defined in a specification for floating point number arithmetics whose most representative example is IEEE754 is positive infinity direction (rounding to a number closer to the positive infinity) is not satisfied. The exponent computation unit 104 performs the exponent computation by using the exponent of Y, and outputs the exponent square root operation result. The exception handling unit 105 outputs the operation result of √Y including the normalized fraction square root operation result whose most significant bit is fixed to be in a prescribed digit, when all the above three conditions are satisfied.

When one of the above three conditions is not satisfied, the bit string data of the normalized fraction square root operation result whose most significant bit is fixed to be in the prescribed digit is output from the fraction computation unit 103, and the bit string data of the corresponding exponent square root operation result is output from the exponent computation unit 104. When all the above three conditions are satisfied, the bit string data of the operation result of √Y including the normalized fraction square root operation result whose most significant bit is fixed to be in the prescribed digit is output from the exception handling unit 105.

As will be described later, in the square root operations of floating point numbers, the position of the most significant bit in the bit string data of the computation result of the fraction changes only when all the above three conditions are satisfied. Because of this, the normalization can be performed by fixing the most significant bit to be in a prescribed position while such a case as above is handled as an exceptional case.

The comparison unit 101 corresponds to, for example a fraction comparison circuit 303 (that will be explained later) shown in FIG. 5 or a fraction comparison circuit 700 shown in FIG. 9. The shifting unit 102 corresponds to, for example, a fraction digit adjustment shifter 304 shown in FIG. 5, a fraction digit adjustment shifter 601 shown in FIG. 8, or a fraction digit adjustment shifter 701 shown in FIG. 9.

The fraction computation unit 103 corresponds to, for example, a fraction computation circuit 317 and a fraction rounding circuit 319 shown in FIG. 5. The exponent computation unit 104 corresponds to, for example, an exponent computation circuit 316 shown in FIG. 5 or an exponent computation circuit 704 shown in FIG. 9. The exception handling unit 105 corresponds to, for example, a special operand processing circuit 315.

In the present embodiment, in division and square root operations of floating point numbers, the operands are optimized in the early stages of the operations or special input operands are processed in exception handling, thereby the result of the exponent computation can be established without waiting for the result of the rounding process to be finished. Thereby, it is possible to determine overflow/underflow only by the result of the exponent computation regardless of the result of the fraction computation. Thus, it is possible to remove a delaying factor that is the most significant in designing.

Figure 4:
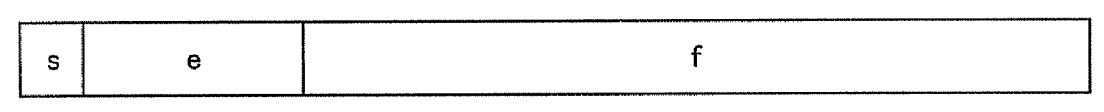

Hereinafter, explanations are given by using an example of the protocol of IEEE (Institute of Electrical and Electronic Engineers) 754 for floating point numbers. The IEEE floating point number consists of a sign s, an exponent e, and a fraction f as shown in FIG. 4, and defines a number (normalized number) represented by the numerical expression shown below, $$(-1)^s \times 2^{(e-b)} \times 1.f$$

where b is a bias value that is 127 in the case of the single precision, and is 1023 in the case of the double precision. In the case of the single precision, the entire bit length of a floating point number is 32, and the bit lengths of s, e, and f are respectively 1, 8, and 23. Also, in the case of the double precision, the entire bit length of a floating point number is 64, and the bit lengths of s, e, and f are respectively 1, 11, and 52.

In the above numerical expression, the integer part of "1.f" is one (referred to as "implicit one"), and the part after the decimal point is a binary value represented by "f". When the computation result is not within the range of the sufficient figure of f, the result is rounded to the least significant bit of the sufficient figure in accordance with the rounding rule of IEEE. When the size of this least significant bit of the sufficient figure is δ, δ=$2^{-23}$ in the case of the single precision, and δ=$2^{-52}$ in the case of the double precision. As is understood from the above explanation, the fraction of the floating point number format of the IEEE is a finite decimal whose minimum unit is δ. The existence range of "1.f" is represented by the inequality below, $$1 \leq 1.f \leq 2-\delta \qquad (1)$$

where "1.f" is not a number that can be consecutive values, but a multiple of δ that satisfies the existence range of the above inequality (1).

$$1.f = a \times \delta$$

where a is an integer.

In other words, "1.f" exists on the lattice points having the interval of δ on the line of real numbers. "Rounding" is to make approximations of numbers that are not multiples of δ by using the multiples of δ existing near them. Accordingly, a value before the "rounding" is a real number that is not subject to this kind of limitation, and a value after the "rounding" can be referred to as a value (=1.f) that satisfies the above limitation.

When a value of a certain computation result before rounding is a value that is out of the range of the inequality (1), the normalization shifting may be necessary for the value (=1.f) after rounding in order to change the value to a value (normalized number) that satisfies the IEEE floating point format.

When a value of a certain computation result before rounding is a value that is within the range of the inequality (1), it is not necessary to perform the normalization shifting on "1.f" after rounding. The upper limit and the lower limit of this inequality are multiples of δ, accordingly when a certain number is within the range of the inequality, the largest (smallest) value after rounding is the same as the upper (lower) limit, and will not exceed (fall less than) the upper (lower) limit.

Next, the fraction computation of the division X÷Y is considered. It is assumed that x represents the mantissa (1.f) of X and y represents the mantissa (1.f) of Y.

First, when $x \geq Y$, the maximum value of the division ($r=x \div y$) is $r=2-\delta$ when $y=1$ and $x=2-\delta$, and the minimum value thereof is $r=1$ when $x=y$. Accordingly, $1 \leq r \leq 2-\delta$ is satisfied, and it can be recognized that the normalization shifting does not have to be performed on the value after rounding on the basis of the inequality (1).

When $x<y$, the normalization shifting on the value after rounding can be skipped by performing a pre-process that is appropriate for the operands. For example, one is subtracted from the exponent of X, and the division of $r=2x \div y$ is performed with the mantissa of 2x.

Then, $2x>y$ is satisfied, $2x/y>1$ is satisfied. Also, because $x<y$ is satisfied, $x/y<1 \Leftrightarrow 2x/y<2$ is satisfied. Accordingly, the inequality below is obtained.

$$1<2x/y<2 \quad (2)$$

From the inequality (2), it is recognized that the most significant bit of 2x/y is in the ones place in the mathematically precise value (value before rounding). Thus, the maximum value that 2x/y can be is examined further in detail.

Because $x<y$ is satisfied, 2x/y becomes the maximum value when x/y is smaller than 1 and is closest to 1, that is, when $x=y-\delta$. Then, $r=2x/y=2-2\delta/y$ is satisfied and also $y<2$ is satisfied, accordingly $2\delta/y>2\delta/2=\delta$ is satisfied. Accordingly, the numerical expression below is satisfied.

$$2x/y=2-2\delta/y<2-\delta \quad (3)$$

When the inequality (2) and the expression (3) are combined, $1<2x/y<2-\delta$ is satisfied, and it is recognized that the normalization shifting does not have to be performed on the value after rounding.

As a pre-process for the operands in the case of x<y, there is also a method of causing the mantissa to be y/2 by adding 1 to the exponent of Y. In this case too, it is possible to demonstrate, in the same manner as above, that the normalization shifting does not have to be performed on the value after rounding.

Next, the fraction computation of the square root operation of √Y is considered. It is assumed that the sign of Y is zero, its exponent is e, and its mantissa (1.f) is y. In this condition, $\sqrt{Y}=\sqrt{(2^{(e-b)} \times y)}$ is satisfied.

When (e-b) is an even number (i.e., 2n), √Y can be changed as below.

$$\sqrt{Y}=\sqrt{(2^{2n} \times y)}=(\sqrt{y}) \times 2^n$$

When (e-b) is an odd number (i.e., 2n+1), √Y can be changed as below.

$$\sqrt{Y}=\sqrt{(2^{(2n+1)} \times y)}=\sqrt{(2^{2n} \times 2y)}=\{\sqrt{(2y)}\} \times 2^n$$

When (e-b) is an even number, if the square root $q=\sqrt{y}$ ($1 \leq y<2$) is satisfied, q satisfies the inequality below.

$$1 \leq q < \sqrt{2}=1.0110\ldots \text{(binary)} \quad (4)$$

The inequality (4) represents that the normalization shifting does not have to be performed on the value of √Y after rounding.

When (e-b) is an odd number, if the root square $q=\sqrt{(2y)}$, $2 \leq 2y<4$ is satisfied, accordingly q satisfies the inequality below.

$$\sqrt{2} \leq q<2 \quad (5)$$

From the inequality (5), it can be recognized that the most significant bit of √(2y) is in the ones place if this value is to be expressed in a mathematically precise manner. Then, the maximum value that √(2y) can be is examined further in detail.

√(2y) can become maximum when $y=2-\delta$ is satisfied. Then, $\sqrt{(2y)}=\sqrt{(4-\delta)}$ is satisfied. Also, it can be assumed that $\delta^2 \ll \delta$ is satisfied. The numerical expression below is obtained.

$$4-4\delta+\delta^2<4-2\delta<4-2\delta+(\delta/2)^2$$

$$\Leftrightarrow (2-\delta)^2<4-2\delta<(2-\delta/2)^2$$

$$\Leftrightarrow 2-\delta<\sqrt{(4-2\delta)}<2-\delta/2 \quad (6)$$

The left side of the expression (6) includes the portion $2-\delta<\sqrt{(4-2\delta)}$, and it can be recognized that √(2y) has exceeded the range in which the necessity of the normalization shifting is eliminated.

Additionally, $2-\delta$ represents the maximum value that "1.f" can be, and $2-\delta/2$ represents "the maximum value that 1.f can be +guard bit size". "Guard bit" is a digit that is lower than the least significant bit, and the size thereof is $\delta/2$. Accordingly, it is recognized that only when the rounding mode is "positive infinity direction", the carrying-over of the most significant bit of √(2y) is caused and the normalization shifting becomes necessary.

It is when $y=2-2\delta$ is satisfied that √(2y) becomes the secondary largest value. In this condition, $\sqrt{(2y)}=\sqrt{(4-\delta)}$ is satisfied. When δ is replaced with 2δ in the expression (6), the inequality below is obtained.

$$2-2\delta<\sqrt{(4-4\delta)}<2-\delta \quad (7)$$

From the inequality (7), it is recognized that √(2y) is within the range in which it eliminates the necessity of the normalization shifting. Because $f(x)=\sqrt{x}$ (x>0) is a monotonically increasing function, to satisfy $\sqrt{x1}<\sqrt{x2}$ and to satisfy x1<x2 are in a relationship of the necessary and sufficient condition. In other words, when x1<x2 is satisfied, $\sqrt{x1}>\sqrt{x2}$ is not satisfied, and when x1<x2 is satisfied, $\sqrt{x1}<\sqrt{x2}$ is always satisfied.

Accordingly, it is recognized that only the case when y becomes the maximum value is the exceptional case, and the normalization shifting is not necessary on the computation results in the other cases.

In the above explanation, consideration is given to the case in which the input mantissa of the square root operation is within the range of $1 \leq y$ or $2y<4$, however, it is possible to consider the case in which the mantissa is within the range of $¼ \leq y$ or $2y<1$. Also in this case, the same explanation can be applied.

From the above consideration, by discriminating the operands when starting the computation and by performing a necessary pre-process, it is possible to delete the logic of the normalization shifting process that would be performed after the rounding process. The discrimination can be expressed as below.

1. Division
mantissa $x<y \Rightarrow$ exponent of x−1, fraction computation $2x \div y$ or $\Rightarrow$ exponent of Y+1, fraction computation $x \div (y/2)$, etc.
2. Square Root Operation
(e−b) is an odd number and mantissa $y=max \Rightarrow$ exception handling Next, by referring to FIGS. 5 through 8, an arithmetic device for performing the above division and square root operation will be explained.

FIG. 5 shows a configuration of an arithmetic device according to the present embodiment. The arithmetic device includes a first operand op1 register 301 for storing the entirety of op1, a second operand op2 register 302 for storing the entirety of op2, a first operand op1 staging latch 306 for storing the entirety of op1, a first operand op1 exponent staging latch 308 for storing the exponent of op1, a second operand op2 staging latch 307 for storing the entirety of op2, a second operand op1 exponent staging latch 309 for storing the exponent of op2, a fraction comparison result staging latch 310 for storing a fraction comparison result, a first operand op1 fraction register 313 for storing the fraction of op1, a second operand op2 fraction register 314 for storing the fraction of op2, a fraction computation circuit output staging latch 318 for storing a computation result of the fraction computation circuit, a fraction comparison circuit 303, fraction digit adjustment shifters 304 and 305, a first operand selector 311 for the fraction computation circuit, a second operand selector 312 for the fraction computation circuit, a computation circuit output selector 320, a special operand processing circuit 315, an exponent computation circuit 316, a fraction computation circuit 317, and a fraction rounding circuit 319.

The special operand processing circuit 315 does not cause the computation unit to perform a usual computation process when the two operands (op1 and op2) are prescribed data, but causes the computation unit to perform exception handling such as a special operand process that outputs a computation result of a fixed value data for the prescribed operand or error handling, or the like. For example, when the square root operation is instructed, all the bits in the fraction of the operand op2 have the values of 1, the value of (e−b) i.e., the difference between the exponent of the operand op2 and the bias value is an odd number, and the rounding direction is "positive infinity", a signal "exp result+1" that is a carry signal for causing the carrying-out of the square root operation result to the most significant bit is output to the exponent computation circuit 316. Also, when an overflow/underflow detection signal "exp ovf/udf" that will be explained later is received from the exponent computation circuit 316, a special computation result or an exception flag is generated, and the generated special computation result or the exception flag is output as a signal "special res".

The exponent computation circuit 316 performs the computation of the exponents of op1 and op2. For example, in division, the exponent xe of op1 and the exponent ye of op2 are used in order to output xe−ye−1 or xe−ye+1 as the exponent computation result signal "exp result". Further, when the signal "exp result+1" is received from the special operand processing circuit 315, one is added to the exponent computation result that is an output of the exponent computation circuit 316. Also, when the overflow/underflow is caused as a result of an exponent computation, an overflow/underflow detection signal "exp ovf/udf" is output to the special operand circuit.

Also, the fraction computation circuit 317 performs division and the square root operation of the fractions of op1 and op2. op1 and op2 respectively correspond to the above described X and Y. Also, the signal denoted by "loop" is a feed-back signal used for performing division by repeating subtraction.

The fraction digit adjustment shifters 304 and 305 respectively shift the bit string data of op1 and op2 to the left or right direction (to the direction of higher-order bit or lower-order bit) as necessary.

FIG. 6 shows a configuration of the special operand processing circuit 315 shown in FIG. 5. The special operand processing circuit 315 includes a special operand detection circuit 401, a generation circuit 402, an AND circuit 403, and an OR circuit 404, and a selector 405.

The special operand detection circuit 401 does not cause the computation unit to perform a usual computation process when the two operands (op1 and op2) are prescribed data, but detects operands that have to undergo exception handling such as a special operand process that outputs a computation result of a fixed value data for the prescribed operand or error handling, or the like in order to output the detection signal to the generation circuit 402 and the OR circuit 404.

One example of the above special operand process is a square root operation performed on an operand in which all the bits in the fraction have the values of 1 (y is the maximum value) in the case when the rounding mode is "positive infinity direction" and the value of (e−b) i.e., the difference between the exponent of the operand and the bias value is an odd number.

The AND circuit 403 outputs, to the OR circuit 404 and the exponent computation circuit 316, the logical products of four signals 411 through 414 that will be explained below as the signal "exp result+1". The signal 411 is an output signal of an instruction decoder (not shown) that is asserted when square root operations are instructed. The signal 412 is an output signal of an operand decoder (not shown) that is asserted when all the bits in the fraction of the operand op2 has the values of one (y is the maximum value). The signal 413 is an output signal of an operand decoder (not shown) that is asserted when the value of (e−b) of the operand op2 is an odd number. The signal 414 is an output signal of a computation mode register (not shown) that is asserted when the rounding mode is "positive infinity direction".

Accordingly, the output signal "exp result+1" of the AND circuit 403 is asserted only if an arithmetic unit does not perform a usual computation process when an operand that is the square root operation target is prescribed data and exception handling such as a special operand process that outputs a computation result of a fixed data for the prescribed operand, error handling, or the like has to be performed in the square root operation. Also, the signal "exp result+1" that is a carry signal for causing the carrying-over in the most significant bit of the square root computation result is output to the exponent computation circuit.

The OR circuit 404 outputs, as the selection signal "sel normal/special", the logical sum between the detection signal from the special operand detection circuit 401 and the output signal of the AND circuit 403.

The generation circuit 402 generates a special computation result or an exception flag on the basis of the detection signal from the special operand detection circuit 401, the output signal of the AND circuit 403, the rounding mode designation signal rd, and the overflow/underflow detection signal "exp ovf/udf" from the exponent computation circuit 316, and outputs the special computation result or the exception flag as the signal "special res" when the overflow/underflow is detected by the overflow/underflow detection signal. The exponent of the special computation result is output as a signal "special exp", and the fraction is output as a signal "special fraction".

Especially, when the output signal of the AND circuit 403 is asserted, the generation circuit 402 generates the result of the square root operation √(2y) of the fraction when the value of (e−b) is an odd number, all the bits in the fraction have the values of 1, and the rounding mode is "positive infinity direction", and outputs the generated result as the signal "special fraction". When all the bits in the fraction have the values of 1, the computation result of (2y) can be identified uniquely, accordingly the computation result is beforehand stored in, for example, the generation circuit 402. In this case, the result of the square root operation of the exponent is supplied from the exponent computation circuit 316 as "exp result".

The selector 405 operates in accordance with the output signal of the AND circuit 403. When the output signal of the AND circuit 403 is asserted with all the conditions of the exception handling being satisfied, the selector 405 selects the computation result "exp result" from the exponent computation circuit 316, and outputs the selected result. Also, when the output signal of the AND circuit 403 is deasserted with at least one of the conditions of the exception handling not being satisfied, the selector 405 selects the signal "special exp" from the generation circuit 402. The special operand processing circuit 315 outputs, together with the signal "special fraction", the output signal of the selector 405 as the signal "special res".

The selector 320 shown in FIG. 5 operates in accordance with the selection signal "sel normal/special" generated by the special operand processing circuit 315, and selects and outputs the signal "special res" from the generation circuit 402 when the selection signal "sel normal/special" is asserted. Also, when the selection signal "sel normal/special" is deasserted, the selector 320 selects and outputs a normal computation result that is generated by the exponent computation circuit 316 and the fraction computation circuit 317.

By using this special operand processing circuit 315, the computation results in the case when the value of (e−b) of the operand that is the square root computation target is an odd number and all the bits in the fraction have the values of 1 can be generated independently of the fraction computation circuit 317. In this case, the output of the fraction rounding circuit 319 is not selected, accordingly shifting for the normalization does not have to be performed.

Figure 7:
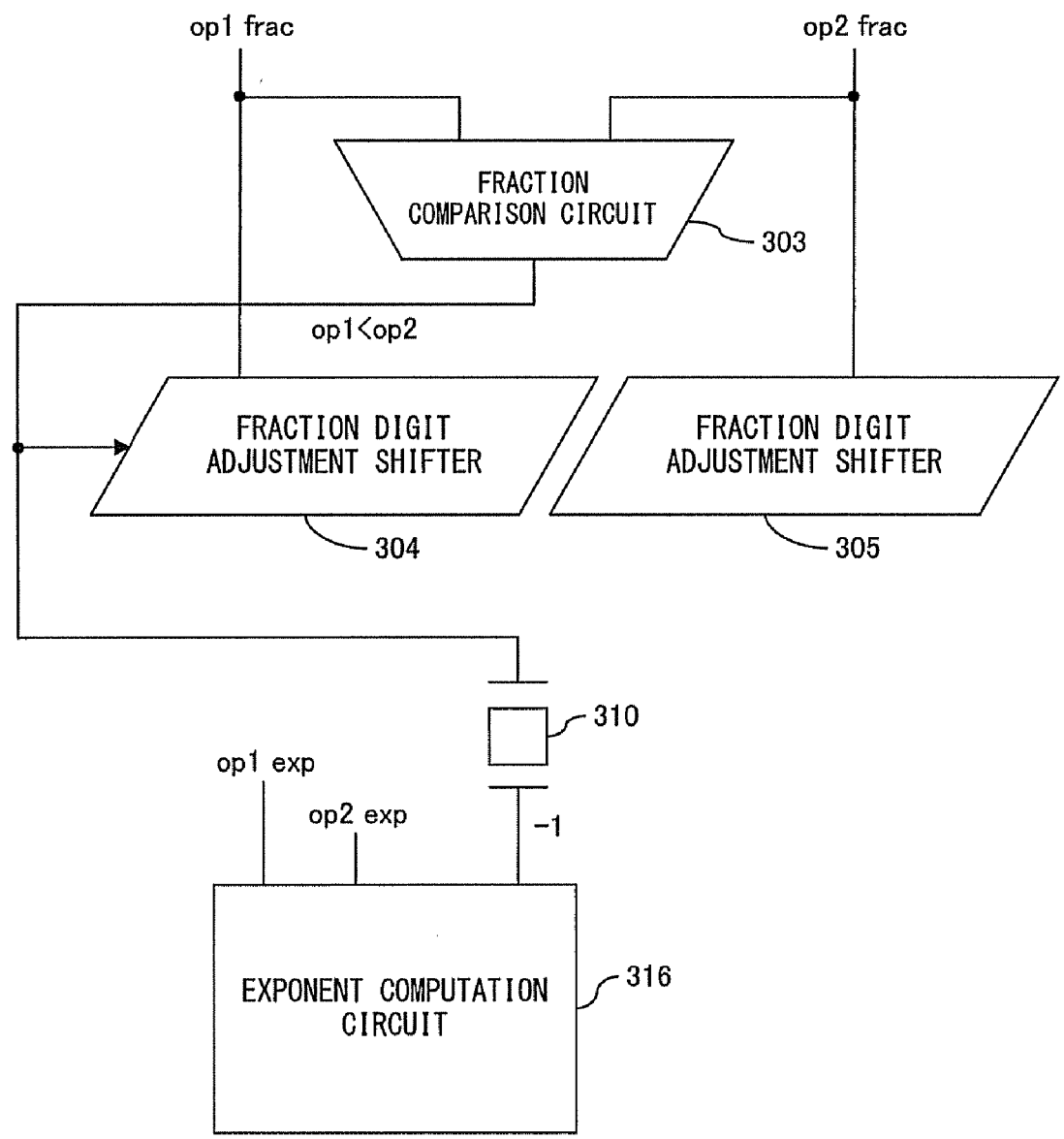
FIG. 7 shows a configuration of subtraction from an exponent of X.

FIG. 7 shows the circuit portion consisting of the fraction comparison circuit 303, the fraction digit adjustment shifters 304 and 305, the fraction comparison result staging latch 310, and the exponent computation circuit 316 shown in FIG. 5. In this example, when x<y is satisfied, one is subtracted from the exponent of X and division 2x÷y is performed on the assumption that the mantissa of the operand op1 is x and the mantissa of the operand op2 is y.

Then, a fraction "op1 frac" of the operand op1 corresponding to the mantissa x is input to the fraction comparison circuit 303 and the fraction digit adjustment shifter 304, and a fraction "op2 frac" of the operand op2 corresponding to the mantissa x is input to the fraction comparison circuit 303 and the fraction digit adjustment shifter 305. Then, the fraction comparison circuit 303 compares "op1 frac" and "op2 frac" to each other, and asserts, when op1 frac<op2 frac is satisfied, an output signal representing this comparison result.

In response to this, the fraction digit adjustment shifter 304 shifts the mantissa x to the left by one bit in accordance with the output from the fraction comparison circuit 303 in order to double the mantissa x including the implicit one. Thereby, the fraction computation circuit 317 generates the computation result of 2x/y.

Also, when it is assumed that the exponents of X and Y are respectively xe and ye, the division result of the exponents are as below.

$$(xe-1)-ye=xe-ye-1$$

Thus, the fraction comparison result staging latch 310 outputs the value of "−1" to the exponent computation circuit 316 when the output signal of the fraction comparison circuit 303 is asserted. In response to this, the exponent computation circuit 316 outputs the computation result "exp result" that is obtained by adding "−1" to the result of subtracting the exponent "op2 exp" of the operand op2 from the exponent "op1 exp" of the operand op1 for the mantissa X.

Further, this computation is not a square root operation, but division, accordingly, the output of the AND circuit 403 shown in FIG. 6 is zero, and "sel normal" is selected as the signal "sel normal/special" that is the output of the special operand processing circuit 315. Accordingly, the "sel normal" side is selected in the selector 320, and "exp result" is output as the final computation result.

FIG. 8 shows a configuration for performing, instead of performing division of 2x÷y, division of x÷(y/2) that is equivalent to the above division of 2x÷y when x<y is satisfied in the example shown in FIG. 7. In this configuration, one is added to the exponent of y, and the fraction digit adjustment shifter 305 shown in FIG. 7 is replaced with the fraction digit adjustment shifter 601.

When op1 and op2 are compared to each other by the fraction comparison circuit 303 and the output signal of the fraction comparison circuit 303 is asserted, the fraction digit adjustment shifter 601 shifts y to the right by one bit in order to multiply the mantissa y including the implicit one by ½. Thereby, the fraction computation circuit 317 generates the computation result of 2x/y similarly to the case shown in FIG. 5.

Also, the result of division of the exponent is as below.

$$xe-(ye+1)=xe-ye-1$$

Accordingly, the computation result of the operations of the fraction comparison result staging latch 310 and the exponent computation circuit 316 shown in FIG. 8 is equivalent to the case shown in FIG. 5.

According to the configuration of FIG. 7 or FIG. 8, when the mantissas x and y of the two operands that are the targets of division satisfy x<y, a fraction computation result in which the most significant bit is fixed to be in the ones place can be obtained only by shifting one of the mantissas. Thereby, the normalization shifting after the rounding process becomes unnecessary.

In order to remove the fraction normalization shifter from an arithmetic device having an after-computation processing circuit both for the division and square root operation, discrimination of two cases that are shown in the examples of FIGS. 7 and 8 are required. In other words, it is necessary to perform the computation under the condition that the positions of the most significant bits of the results of division and square root operation are the same to each other.

In the examples shown in FIGS. 7 and 8, the most significant bit of the computation result after the rounding process is fixed to be in the ones place, however, the position of the most significant bit can be a place other than the ones place. For example, it is also possible to use an arithmetic method in which the most significant bit is fixed to be in the first decimal place. In this case, the above described pre-process of division is modified, for example, as described below, and in the square root operation, the computation of the fraction is performed within the range in which ¼≦y or 2y<1 is satisfied.

mantissa x≧y⇒exponent of X+1, fraction computation (x/2)÷y

FIG. 9 shows a configuration in which this computation method is applied. In this configuration, the fraction comparison circuit 303 shown in FIG. 7 is replaced with a fraction comparison circuit 700, and the fraction digit adjustment shifter 304 and the fraction digit adjustment shifter 305 are replaced with fraction digit adjustment shifters 701 and 702. Also, the fraction comparison result staging latch 310 and the exponent computation circuit 316 are replaced with a register 703 and an exponent computation circuit 704. Further, a subtraction circuit 705 is added in a stage later than the exponent computation circuit 704, and a fraction normalization shifter 706 is added to a stage later than the fraction rounding circuit 319.

When performing division, the fraction comparison circuit 700 compares "op1 frac" and "op2 frac" to each other, and asserts, when op1 frac≧op2 frac is satisfied, the output signal representing this computation result.

In response to this, the fraction digit adjustment shifter 701 shifts the mantissa x to the right by one bit in order to multiply the mantissa x including the implicit one by ½. Thereby, the fraction computation circuit 317 generates the computation result of x/(2y), and the fraction rounding circuit 319 outputs computation result in which the most significant bit is fixed to be in the first decimal place with respect to the computation result of the fraction computation circuit 317. Then, the fraction normalization shifter 706 shifts the computation result of the fraction rounding circuit 319 to the left by one bit, and outputs the computation result in which the most significant bit is fixed to be in the first decimal place, and thereby performs the normalization.

Also, the result of division of the exponent is represented as below.

$$(xe+1)-ye=xe-ye+1$$

Then, the register 703 outputs to the exponent computation circuit 704 a value representing "+1" when the output signal of the fraction comparison circuit 700 is asserted. In response to this, the exponent computation circuit 704 outputs a value obtained by adding "+1" to the result of subtracting the exponent "op2 exp" of the operand op2 corresponding to ye from the exponent "op1 exp" of the operand corresponding to xe.

However, it is necessary to perform subtraction on the result of the exponent computation because the fraction normalization shifter 706 shifts the result of the exponent computation to the left. Accordingly, the subtraction circuit 705 subtracts one from the output of the exponent computation circuit 704, and outputs the result as the computation result "exp result".

When op1 frac<op2 frac (x<y) is satisfied, the output signal of the fraction comparison circuit 700 is deasserted, and "op1 frac" and "op2 frac" are supplied to the fraction computation circuit 317 as they are, thereby x/y is generated as the computation result. Also, the exponent computation circuit 704 outputs the result of subtracting "op2 exp" from "op1 exp". The post-processes performed by the fraction normalization shifter 706 and the subtraction circuit 705 are the same as in the case when x≧y is satisfied.

Next, when performing the square root operation, the signal "squareroot" that is an output of an instruction decoder (not shown) is asserted. In response to this, the fraction digit adjustment shifter 702 shifts the mantissa y to the right by two bits in order to multiply the mantissa y including the implicit one by ¼. The exponent computation circuit 704 performs the square root operation after adding two to "op2 exp". Thereby, the fraction computation circuit 317 shown in FIG. 5 performs a computation in the range in which ¼≦y or 2y<1 is satisfied. The fraction rounding circuit 319 outputs a computation result in which the most significant bit is fixed to be in the first decimal place. The post-processes performed by the fraction normalization shifter 706 and the subtraction circuit 705 are the same as in the case of division.

According to the configuration shown in FIG. 9, fraction computation results in which the most significant bits are fixed to be in the first decimal place can be obtained both by division and square root operation. In this case, the normalization shifting has to be performed after the rounding process. However, a controlling process based on a carry-out signal output from the fraction rounding circuit 319 becomes unnecessary.

In the above configurations, the most significant bits of the results of the division and square root operation are fixed to be in the same positions, however, when after-computation processing circuits are provided respectively for division and square root operation, the positions expected for the most significant bits may be determined respectively for the computations.

Figure 10:
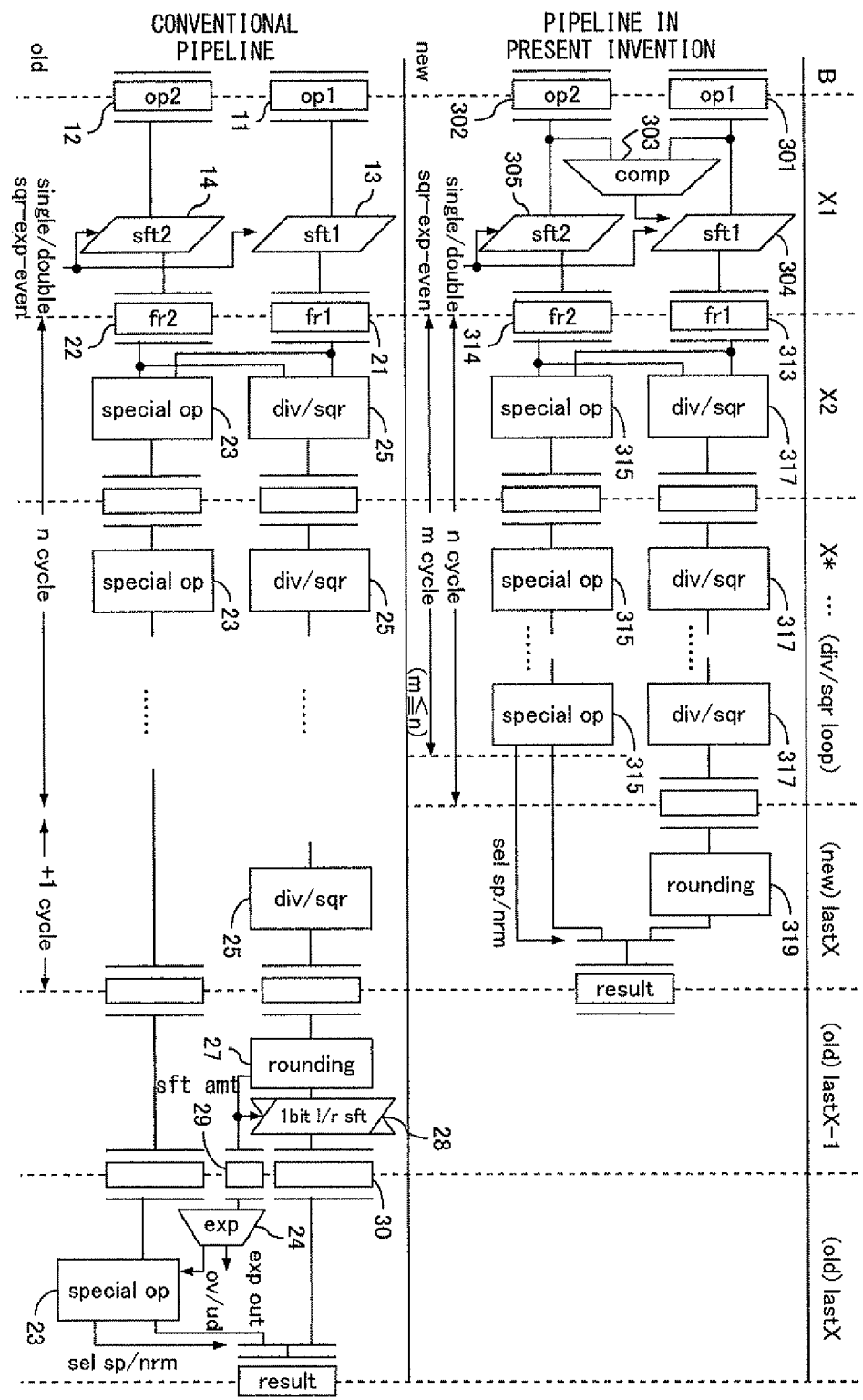
FIG. 10 shows the effect of the present invention.

FIG. 10 shows the pipeline of the conventional arithmetic device and the pipeline of the arithmetic device shown in FIG. 5 according to the present invention in order to show the effect of the speedup of computations in the present invention, in which the number of stages in the pipeline of the present invention is smaller. The left column represents names of stages including stage B (Beginning: pre-process), stage X1 (eXecute1: first execution), stage X2 (eXecute2: second execution), stage X* (eXecute*: the *-th execution), stage (new) lastX (final stage in the present invention), stage (old) lastX−1 (final−1 stage in the conventional example), and stage (old) lastX (final stage in the conventional example).

First, the pipeline process in the conventional example shown in the right half of FIG. 10 is explained. The pipeline in the conventional example consists of the register 11 for storing the operand op1, the register 12 for storing the operand op2, the fraction digit adjustment shifters 13 and 14 for adjusting the digits of the fractions of the operands that undergo the computation and computation precision, staging latches 21 and 22 for storing computation results between the pipeline computation stages, a division/square root operation unit 25, a special operand processing circuit 23, a fraction rounding processing circuit 27, an one-bit left/right shifter 28, a shifting amount storing staging latch 29, a rounding process result storing staging latch 30, an exponent computation circuit 24, a selector (not denoted by any numeral), and a computation result storing register (result).

In the conventional examples, in the stage X1 shown in FIG. 10, the fraction digit adjustment shifters 13 and 14 perform the adjustment of digits of the fraction of the operand that is going to undergo the computation. Next, in the stage X2 through the stage (new) lastX, division or square root operation is performed by using the division/square root operation unit 25 on the basis of a loop process ("single/double sqr-exp: n cycle+1 cycle" in FIG. 10) for repeating subtraction. Also, in the stage (old) lastX−1 after this loop process, the fraction rounding circuit 27 performs fraction rounding process, and the one-bit left/right shifter performs the rounding process on the basis of the signal "sift amt" that is an output of the fraction rounding process circuit and indicates a rounding direction, and the rounding process result is stored in the rounding process result storing staging latch 30. Further, in the stage (old) lastX, the exponent computation is performed by the exponent computation circuit 24. Additionally, when an overflow/underflow is caused in the exponent computation circuit 24, the exception handling according to the special operand processing circuit 23 is performed by using the overflow/underflow detection signal ov/ud, and when the exception handling is caused due to the signal "sel sp/nm" from the special operand processing circuit 23, the output "special res" (not shown) output from the special operand processing circuit 23 is selected as the computation result, and in the other cases, the rounding process result stored in the rounding process result storing staging latch 30 is stored in the computation result storing register (result).

Next, the pipeline process shown in the left half in FIG. 10 will be explained. The pipeline in the present invention includes the first operand register 301 for storing the operand op1, the second operand register 302 for storing the operand op2, the fraction comparison circuit 303, the fraction digit adjustment shifters 304 and 305 for adjusting the digits of the fractions of the operands that undergo the computation and the computation precision, the staging latches 313 and 314 for storing the computation results between the pipeline computation stages, the division/square root operation unit 317, the fraction rounding circuit 319, a selector (not denoted by any numeral), and the computation result storing register (result).

According to the present invention, in the stage X1 shown in FIG. 10, the fractions of the operand that are going to undergo the computation by the fraction comparison circuit 303 are compared, and the digit adjustment of the fractions of the operands to be computed are performed by using the fraction digit adjustment shifters 304 and 305 by using this comparison result. Next, in the stage X2 through the stage (div/spr loop), division or a square root operation is performed in a loop process ("single/double: n cycle" in FIG. 10) in which subtraction is repeated, or the exception handling ("sqr-exp: m cycle" in FIG. 10) such as the special operand process of outputting the computation result of the fixed value for prescribed operand, the error handling or the like, without performing an usual computation process by using the arithmetic unit when the operands are the prescribed operands. Also, in the stage (new) lastX after the loop process, the fraction rounding circuit 319 performs the rounding process. Further, in accordance with the signal "sel sp/nm" from the special operand processing circuit 315, the rounding process result is selected in the case of the usual process, and the rounding process result is registered in the computation result storing register (result). Alternatively, in the case of the special operand process, the error handling or the like, the output "special res" (not shown) of the special operand processing circuit 315 is selected as the computation result in accordance with the signal "sel sp/nm" from the special operand processing circuit 315, and the selected output is stored in the computation result storing register (result) as the computation result.

Accordingly, in the case of the square root operation in the present invention, the exception handling by the special operand processing circuit 315 and the normal computation can be performed in parallel, therefore the latency or the number of computation cycles does not increase in the normal computations. Accordingly, as soon as the processes by the fraction rounding circuit 319 are finished, square root computations are completed ("single/double: n cycle" in FIG. 10).

In general, when division is to be performed, x and y have to be compared to each other before the fraction computation is performed as in the conventional examples, accordingly there is a probability that latency (number of computation cycles) in the computation pipeline increases.

However, as in the case of the conventional arithmetic device shown in FIG. 10, when the computation is continued without giving special treatment to the case of x<y, the normalization shifting after the rounding process and the exponent addition become necessary, and also it becomes necessary to calculate the quotient for one more bit because the position of the most significant bit of the computation result is not fixed. Accordingly, it is necessary to perform the loop process of the fraction one more time ("single/double: n+1 cycle" in FIG. 10). In the division/square root operation of the convergence type such as the Newton-Raphson method, the Goldschmidt method, etc, the precision of the convergence error that is higher by +1 bit is required. In other words, when the computation pipeline shown in FIG. 10 according to the present invention and the computation pipeline in the conventional examples are compared to each other, the loop process of the fraction in division in the present invention is shortened by one stage (+1 cycle in FIG. 10), and because the exception handling ("sqr-exp: m cycle" in FIG. 10) such as the special operand process, the error handling or the like is shorter ($m \leq n$ in FIG. 10) than the normal computation process ("single/double: n cycle" in FIG. 10), accordingly the parallel processing can be realized, and the exception process after the rounding process as in the conventional pipeline can be skipped, thereby the pipeline can be shortened by two stages.

When the influence of the process of the exponent overflow/underflow upon the number of stages of the computation pipeline, the delay, and the complexity of the logic (fraction normalization process→exponent addition→exponent overflow/underflow→generation of a computation result and a flag in special operand process) is considered, it is possible to think that the arithmetic device according to the present invention has merits that are more important than the merit in the case of the comparison between x and y before the computation in the stage B in FIG. 10.

As described above, in the arithmetic device shown in FIG. 10, $m \leq n$ is usually satisfied where n represents the number of computation cycles necessary for the loop process of the fraction, and m represents the number of cycles necessary for the exception handling performed by the special operand processing circuit 315. Thereby, the exception handling can be finished earlier than the loop process of the fraction.

By contrast, in the conventional arithmetic device, it is not possible to perform the process of the fraction overflow/underflow until the fraction computation is not finished, thus the exception handling is finished only when the process of the fraction rounding circuit 27 has been finished.

Also, in view of the simplicity of the computation, the method of the arithmetic device according to the present invention in which the operands are compared to each other in order to determine which operand is greater and an appropriate pre-process is performed on the input for the fraction computation circuit 317 is desirable.

As explained above, according to the present invention, the most significant bits of the results of the fraction computation can be fixed to be in prescribed positions regardless of the arithmetic method that is used for division/square root operation of floating point numbers. Accordingly, it is not necessary to determine whether the normalization shifting after the rounding process is necessary or not, thereby it is possible to determine overflow/under flow or the like in the computation results of the exponents separately from the computation of the corresponding fractions. Accordingly, the speed of the entire computation increases and the circuit configurations become simple.

Also, the occurrence frequency of the logic failures is reduced because of the simplified logic circuit, and the reduction of the time for the circuit simulation can be expected.

What is claimed is:

1. An arithmetic device for performing a computation on floating point operands X and Y having a fraction and an exponent, comprising:
    a comparison unit to compare magnitude of a fraction xf of the X and a fraction yf of the Y;
    a shifting unit to shift a mantissa x including the xf or a mantissa y including the yf in accordance with a comparison result between the xf and the yf;
    a fraction computation unit to perform a fraction computation by using the mantissa that was shifted by the shifting unit and another mantissa, and output a computation result of a fraction in which a position of a most significant bit is fixed to be in a prescribed digit; and an exponent computation unit to perform an exponent computation by using an exponent xe of the X and an exponent ye of the Y, modify a result of the exponent computation in accordance with the comparison result, and output a computation result of an exponent.

2. The arithmetic device according to claim 1, wherein:
when the comparison unit outputs a comparison result that indicates that the xf is smaller than the yf:
the shifting unit shifts the x to a higher-order direction;
the fraction computation unit generates a result of division of 2x/y by using the mantissa x shifted by the shifting unit and the mantissa y; and
the exponent computation unit generates a result of subtraction of xe−ye−1.

3. The arithmetic device according to claim 1, wherein:
when the comparison unit outputs a comparison result that indicates that the xf is smaller than the yf:
the shifting unit shifts the y to a lower-order direction;
the fraction computation unit generates a result of division of 2x/y by using the mantissa x and the mantissa y shifted by the shifting unit; and
the exponent computation unit generates a result of subtraction of xe−ye−1.

4. The arithmetic device according to claim 1, wherein:
when the comparison unit outputs a comparison result that indicates that the xf is equal to or greater than the yf:
the shifting unit shifts the x to a lower-order direction;
the fraction computation unit generates a result of division of x/2y by using the mantissa x shifted by the shifting unit and the mantissa y; and
the exponent computation unit generates a result of subtraction of xe−ye+1.

5. The arithmetic device according to claim 1, further comprising when a square root operation $\sqrt{Z}$ is performed on a floating point operand Z having a fraction and an exponent:
an exception handling unit to generate a square root operation result of $\sqrt{Z}$ when all the information of the fraction of the Z is one, ze−b that is a difference between an exponent ze of the Z and a bias value b in accordance with a computation precision is an odd number, and a rounding mode is positive infinity direction; and
a selection unit to select an output of the exponent computation unit or an output of the exception handling unit.

6. The arithmetic device according to claim 5, wherein:
the exception handling unit generates a computation result of $\sqrt{Z}$ including a fraction square root operation result in which a position of a most significant bit is fixed to be in a prescribed digit.

7. The arithmetic device according to claim 5, wherein:
the exponent computation unit and the exception handling unit generate computation results in parallel.

8. An arithmetic device for performing a square root operation of $\sqrt{Y}$ on a floating point operand Y having a fraction and an exponent, comprising:
a fraction computation unit to perform a fraction computation by using a fraction of the Y and output a fraction square root operation result in which a position of a most significant bit is fixed to be in a prescribed digit when any of three conditions that all the information of a fraction of the Y is one, ye−b that is a difference between an exponent ye of the Y and a bias value b in accordance with a computation precision is an odd number, and a rounding mode is a positive infinity direction is not satisfied;
an exponent computation unit to perform an exponent computation by using an exponent of the Y and output a square root computation result of the exponent of the Y; and
an exception handling unit to output a computation result of $\sqrt{Y}$ including a fraction square root operation result in which a position of a most significant bit is fixed to be in a prescribed digit when the three conditions are satisfied.

9. An information processing apparatus having an arithmetic device for performing a computation on floating point operands X and Y having a fraction and an exponent, comprising:
a comparison unit to compare magnitude of a fraction xf of the X and a fraction yf of the Y;
a shifting unit to shift a mantissa x including the xf or a mantissa y including the yf in accordance with a comparison result between the xf and the yf;
a fraction computation unit to perform a fraction computation by using the mantissa x shifted by the shifting unit and the mantissa y, and output a computation result of a fraction in which a position of a most significant bit is fixed to be in a prescribed digit regardless of the comparison result; and
an exponent computation unit to perform an exponent computation by using an exponent xe of the X and an exponent ye of the Y, modify a result of the exponent computation in accordance with the comparison result, and output a computation result of an exponent.

10. An information processing apparatus having an arithmetic device for performing a square root operation of $\sqrt{Y}$ on a floating point operand Y having a fraction and an exponent, comprising:
a fraction computation unit to perform a fraction computation by using a fraction of the Y and output a fraction square root operation result in which a position of a most significant bit is fixed to be in a prescribed digit, when any of three conditions that all the information of a fraction of the Y is one, ye−b that is a difference between an exponent ye of the Y and a bias value b in accordance with a computation precision is an odd number, and a rounding mode is a positive infinity direction is not satisfied;
an exponent computation unit to perform an exponent computation by using an exponent of the Y and output a square root computation result of the exponent of the Y; and
an exception handling unit to output a computation result of $\sqrt{Y}$ including a fraction square root operation result in which a position of a most significant bit is fixed to be in a prescribed digit when the three conditions are satisfied.

11. An arithmetic method of performing a computation on floating point operands X and Y having a fraction and an exponent, comprising:
comparing magnitude of a fraction xf of the X and a fraction yf of the Y by an arithmetic device;
shifting a mantissa x including the xf or a mantissa y including the yf in accordance with a comparison result between the xf and the yf by the arithmetic device;
performing a fraction computation by the arithmetic device, by using the mantissa shifted by the shifting unit and another mantissa, and outputting a computation result of a fraction in which a position of a most significant bit is fixed to be in a prescribed digit regardless of the comparison result; and
performing an exponent computation by the arithmetic device, by using an exponent xe of the X and an exponent ye of the Y, modifying a result of the exponent computation in accordance with the comparison result, and outputting a computation result of an exponent.

12. An arithmetic method of performing a square root operation of $\sqrt{Y}$ on a floating point operand Y having a fraction and an exponent, comprising:

performing a fraction computation by an arithmetic device, by using a fraction of the Y and outputting a fraction square root operation result in which a position of a most significant bit is fixed to be in a prescribed digit when any of three conditions that all the information of a fraction of the Y is one, ye−b that is a difference between an exponent ye of the Y and a bias value b in accordance with a computation precision is an odd number, and a rounding mode is a positive infinity direction is not satisfied;

performing an exponent computation by the arithmetic device, by using an exponent of the Y and outputting a square root computation result of the exponent of the Y; and outputting a computation result of $\sqrt{Y}$ including a fraction square root operation result in which a position of a most significant bit is fixed to be in a prescribed digit when the three conditions are satisfied by the arithmetic device.

* * * * *

UNITED STATES PATENT AND TRADEMARK OFFICE
CERTIFICATE OF CORRECTION

| | |
|---|---|
| PATENT NO. | : 8,166,092 B2 |
| APPLICATION NO. | : 12/124696 |
| DATED | : April 24, 2012 |
| INVENTOR(S) | : Shiro Kamoshida |

It is certified that error appears in the above-identified patent and that said Letters Patent is hereby corrected as shown below:

On the Left hand Column of the Title page of the Patent, the Related U.S. Application Data should be added below the Prior Publication Data and above the International Classification as shown below:

Item -- (63)    Related U.S. Application Data

Continuation of application No. PCT/JP2005/022182, filed on December 2, 2005 --

Signed and Sealed this
Tenth Day of July, 2012

David J. Kappos
*Director of the United States Patent and Trademark Office*